United States Patent Office 3,076,085
Patented Jan. 29, 1963

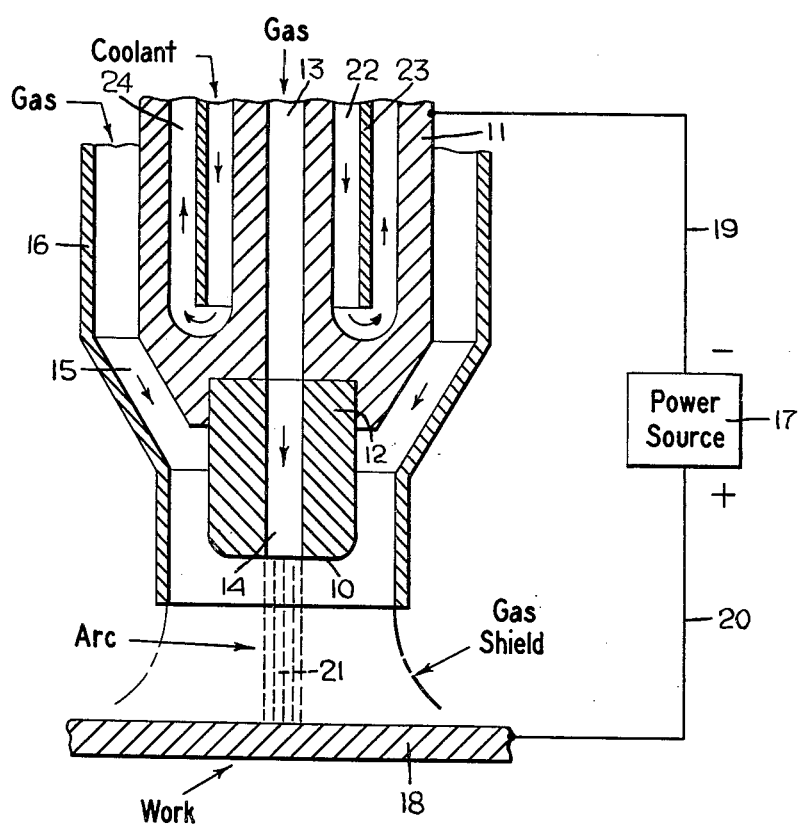

3,076,085
HIGH CURRENT NON-CONSUMABLE HOLLOW ELECTRODE
Donald W. Sundstrom, Indianapolis, Ind., assignor to Union Carbide Corporation, a corporation of New York
Filed Apr. 11, 1960, Ser. No. 21,406
8 Claims. (Cl. 219—75)

This invention pertains to apparatus and process for obtaining substantially non-consumable electrode operation at high current levels.

Solid carbon electrodes have been used in electric furnaces at current levels of thousands of amperes, but such electrodes are rapidly consumed by such operation, and any material being so heated is contaminated with carbon. Carbon electrodes with a central cavity in the arcing end of the electrode have also been used in an attempt to increase arc stability and possibly reduce electrode consumption. In this electrode variation, the arc tends to strike inside the cavity and proceeds to enlarge it by erosion until the electrode fails rapidly by internal consumption. It has also been found that carbon electrode consumption can be reduced somewhat by passing an inert gas stream, such as argon, down through the passage in a hollow electrode. However, even under these conditions, the electrode is still consumed and presents contamination problems if a clean arc is desired.

Clean arcs having insignificant electrode losses at relatively high current levels are highly desired by industry, especially for melting reactive materials, such as titanium, and for heating gases to be used in high velocity wind tunnels for materials testing.

Solid tungsten electrodes with or without emissive additives, such as thoria or yttria, have previously been tested at current levels above about 4000 amperes and they generally had significant weight losses.

The main object of the present invention is to prevent substantial weight losses (less than about 1–2 grams per hour) for metal electrodes at current levels above about 4000 amperes and under extended operation of several hours or more.

This invention comprises novel apparatus of a metal electrode, a hollow passage means through the electrode and out at the arcing surface, means for passing a gas stream through such hollow passage, means for substantially surrounding said electrode with a second gas stream, and means for maintaining a high current electric arc between said metal electrode and another electrode. It is preferred that the metal electrode consist of tungsten with minor amounts of emissive additives, such as thoria or yttria.

In the drawing, the single figure is a vertical section through apparatus useful for carrying out the present invention.

Metal electrode 10 is supported by electrode holder 11 preferably by means of press-fit connection 12. Other connection means such as welded or threaded joints could also be used. Gas passage means for an inner gas stream are provided by passage 13 in electrode holder 11 and connecting passage 14 in electrode 10. An outer shielding gas stream is passed through the annular space 15 between gas cup 16 and electrode holder 11. The gases which are employed in the inner gas stream and its outer shielding gas stream should be relatively inert with respect to the metal electrode 10. Such gases are exemplified by argon, helium, nitrogen or hydrogen. A power supply 17 is connected between electrode holder 11 and another electrode 18 by means of leads 19 and 20 respectively to provide means for maintaining the arc 21. Fluid cooling means are also provided to remove cathode heat from the electrode holder. Cooling fluid, such as water or liquid metal, flows in through annular passage 22 between cooling tube 23 and electrode holder 11 and out through annular passage 24. Electrode 18 may be either in the work material form as shown or in the form of a nozzle electrode of the type disclosed in the co-pending application of Cuddihy and Reed, Serial No. 769,895 filed October 27, 1958, now abandoned.

In the high current range above 4000 amperes and especially above 5000 amperes, the metal electrode when used as a cathode, should have a minimum diameter of about ½ inch. While no known upper useful limit exists, electrodes made of tungsten, for example, are not generally available larger than 1 inch in diameter. Such 1 inch diameter electrodes, however, containing 1–2 weight percent thoria have been conveniently used at current levels as high as 9000 amperes with the present invention with insignificant weight loss. For electrodes in the diameter range of ½–1 inch, the electrode passage, preferably located along the longitudinal axis, is about ⅛–⅜ inch in diameter. For operation at these current levels above 5000 amperes, the preferred electrode is ¾–1 inch in diameter with a ¼–⅜ inch diameter central passage.

Another aspect of the present invention is a process for operating an electrode at high current levels with insignificant weight loss. This process comprises concurrently passing a first inner gas stream out through a pasage in the arcing surface of a hollow electrode, passing a second gas stream around the outside of the hollow electrode to help shield it from contamination, and maintaining an arc between said hollow electrode and another electrode spaced therefrom. The inner gas stream is preferably about 25–150 c.f.h. and the outer gas stream is preferably about 100–300 c.f.h. when one desires to use minimum gas flows for effective operation. Higher gas flows could also be used if desired. In addition to providing insignificant weight loss of the electrode, this procedure enables several gas streams to be mixed in the arc zone. One gas or gas mixture can pass through the hollow electrode and the other gas or gas mixture can pass around the electrode.

While we do not wish to be bound by any theory, the following is one possible explanation for the novel results of this invention. Normally, an arc tends to originate from a small area which is usually located at about the center of an electrode surface. In this invention, the arc appears to originate along the entire periphery of the electrode passage outlet, thus increasing the effective electrode area and lowering the electrode current density. This leads to lower arc erosion. Secondly, the gas stream flowing through the passage tends to prevent the arc from striking back up inside the passage and eroding the electrode interior.

In order to obtain maximum useful electrode life at currents above about 4000 amperes, it has been found preferable to "condition" to electrode prior to use by operating it for a short period of time (about 5 min.–50 min.) at a lower current level. In the case of cathodes containing minor amounts of emissive additives, this "ageing" apparently allows the emissive material to migrate to the electrode surface where it can be most effective.

The following examples describe various modifications of the present invention in actual practice.

*Example 1*

The electrode apparatus consisted of a 1-inch diameter thoriated tungsten electrode supported by a water-cooled holder. The electrode extended about ¾ inch beyond the electrode holder. The outer gas cup was a 1⅜ inch diameter water-cooled nozzle surrounding the tungsten electrode and extended about ¼ inch beyond the end of the cathode. A 150 c.f.h. argon stream passed down through a ⅜ inch diameter passage in the center of the tungsten cathode and a 300 c.f.h. argon stream passed down between the outer gas cup and the cathode. The anode was a rotating water-cooled graphite block positioned about 3½ inches from the cathode tip. An arc of 7000 amperes and 110 volts was maintained between the electrodes for a total of about 2 hours. The tungsten cathode had a weight loss of only 0.049 gram. Operation at this current level with a solid thoriated tungsten cathode produced total destruction of the arcing surface within less than an hour.

*Example II*

The same apparatus was used as described in Example I above. An arc of 8000 amperes and 125 volts was maintained between the hollow thoriated tungsten cathode and the carbon anode while 25 c.f.h. argon passed through the cathode passage and 200 c.f.h. argon passed around the cathode. The run was continued for 20 minutes with a tungsten cathode weight loss of only 0.071 gram. There was no visible damage to the cathode surface during the run. Operation under similar current conditions with a solid tungsten cathode resulted in total destruction of the arcing tip within five minutes.

*Example III*

Apparatus similar to that described in Example I was used with the exception that a 1½ inch diameter gas cup was employed. An arc of 9000 amperes and 115 volts was maintained between the hollow thoriated tungsten cathode and the carbon anode while 100 c.f.h. argon flowed through the hollow cathode and 300 c.f.h. argon passed around the cathode. The run was continued for 20 minutes with a tungsten cathode loss of only 0.079 gram. A small pit at the periphery of the cathode passage was the only visible damage to the cathode surface. Operation at similar current conditions could not be maintained with prior solid tungsten electrodes without complete electrode destruction.

*Example IV*

The cathode apparatus consisted of a ½ inch diameter thoriated tungsten electrode supported by a water-cooled holder. The electrode extended about ½ inch beyond the holder. The outer gas cup was a 1⅜ inch diameter water-cooled nozzle surrounding the tungsten electrode and extended ¼ inch beyond the end of the cathode. A 50 c.f.h. argon stream passed down through a ⅛ inch diameter passage in the center of the tungsten cathode and a 150 c.f.h. argon shielding gas stream passed down between the outer gas cup and the cathode. An arc of 5000 amperes and 100 volts was maintained between the cathode and a rotating water-cooled carbon anode for about 20 minutes. The tungsten cathode sustained a weight loss of about 0.075 gram with no visible damage.

In most of these examples, the arcing tip of the hollow cathode was not completely shielded from atmospheric contamination. It thus appears that the present invention is less sensitive to atmospheric contamination than was prior art electrode apparatus.

It can thus be seen from the above examples that the present invention, both in apparatus and in process, significantly increases the long term current-carrying capacity of metal electrodes with insignificant electrode weight loss. The resulting clean uncontaminated arc is widely useful in industry. In addition to these advantages, the present invention provides an arc of enhanced stability.

While the above discussion is related primarily to application of the present invention to a refractory metal cathode, it is understood that some forms of the invention may also be useful for high current metal anodes. Such apparatus may also find some utility in high current alternating current operation.

What is claimed is:

1. Method of preventing substantial weight losses for metal electrodes at current levels above 4000 amperes and under extended operation for several hours, which comprises passing a stream of gas relatively inert with respect to the electrode at at least 25–150 c.f.h. through the central passage of a hollow metal electrode and out at the arcing surface, surrounding said electrode with a second stream of gas relatively inert with respect to the electrode at at least 100–300 c.f.h., and maintaining a high current electric arc about 4000 amperes between said metal electrode and another electrode.

2. Method as claimed in claim 1, in which the hollow metal electrode consists of tungsten with minor amounts of emissive additives selected from the group consisting of thoria and yttria.

3. Method as claimed in claim 1, in which the gas passing through the hollow electrode is selected from the group consisting of argon, helium, nitrogen and hydrogen.

4. Method of preventing substantial weight losses for metal electrodes at high current levels, which comprises concurrently passing an inner stream of gas relatively inert with respect to the electrode at at least 25–150 c.f.h. out through a passage in the arcing surface of a hollow electrode, passing a second stream of gas relatively inert with respect to the electrode at at least 100–300 c.f.h. around the outside of the hollow electrode to help shield it from contamination, and maintaining an arc above 4000 amperes between said hollow electrode and another electrode spaced therefrom.

5. Apparatus for preventing substantial weight losses for metal electrodes at current levels above 4000 amperes and under extended operation for several hours, comprising a hollow electrode having an axial passage, means for passing a stream of gas relatively inert with respect to the electrode at at least 25–150 c.f.h. down through said axial passage and out at the arcing surface, means for substantially surrounding said electrode with a second stream of gas relatively inert with respect to the electrode at at least 100–300 c.f.h., and means for maintaining a high current electric arc above 4000 amperes between said hollow metal electrode and another electrode.

6. Apparatus as claimed in claim 5, in which said hollow metal electrode consists of tungsten with minor amounts of emissive additives, and has an outer diameter from one half to one inch, and the axial passage has a diameter from one-eighth to three-eighths inch.

7. Apparatus for preventing substantial weight losses for metal electrodes at current levels above 4000 amperes and under extended operation for several hours, comprising an electrode holder having a passage, a hollow metal electrode in said holder connecting with said passage, means for passing inert gas through said connecting passages, a gas cup surrounding said electrode holder and spaced therefrom, means for passing an outer inert gas stream through the annular space between said gas cup and electrode holder, and means for supplying high current through said holder to said electrode and to another electrode to maintain an arc therebetween.

8. Apparatus as claimed in claim 7, in combination with a cooling tube for supplying annular streams of cooling fluid into and out of said electrode holder.

References Cited in the file of this patent

UNITED STATES PATENTS

| | | |
|---|---|---|
| 1,589,017 | Lincoln | June 15, 1926 |
| 2,806,124 | Gage | Sept. 10, 1957 |
| 2,963,570 | Rieppel | Dec. 6, 1960 |